Dec. 10, 1968 H. H. BRITCHER, JR 3,415,421
MATERIAL POT WITH CONTROLLED DUMPING MECHANISM
Filed Feb. 2, 1967
2 Sheets-Sheet 1

To Slag Granulating Apparatus

INVENTOR.
HARRY H. BRITCHER, JR.
By Donald G. Walton
Attorney

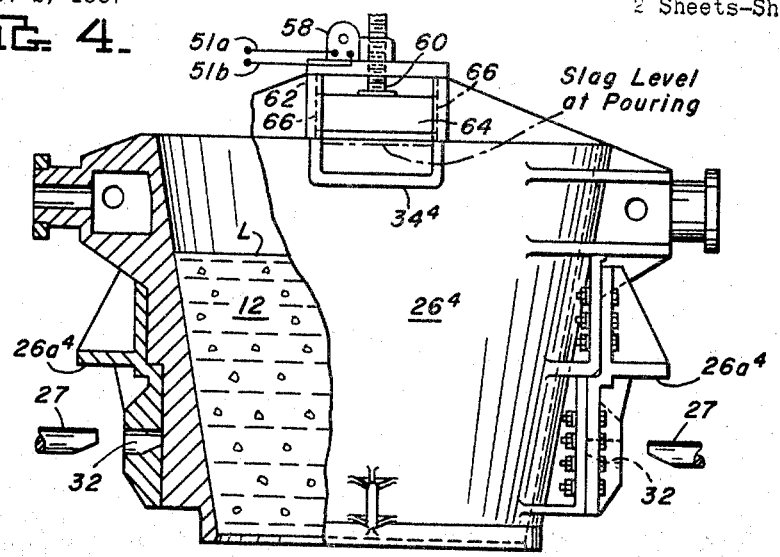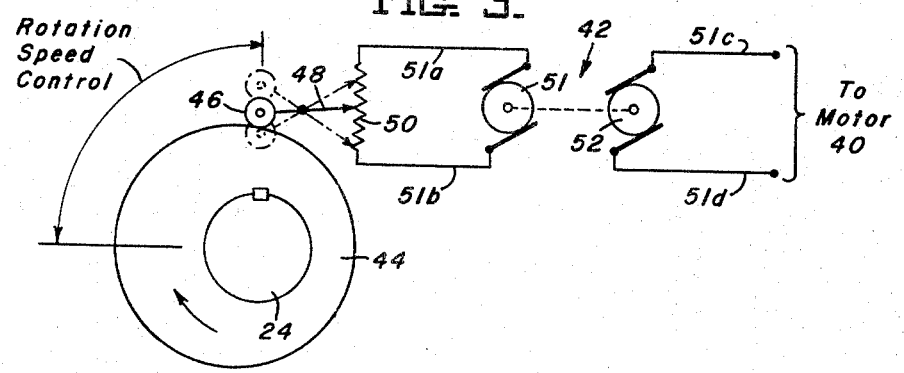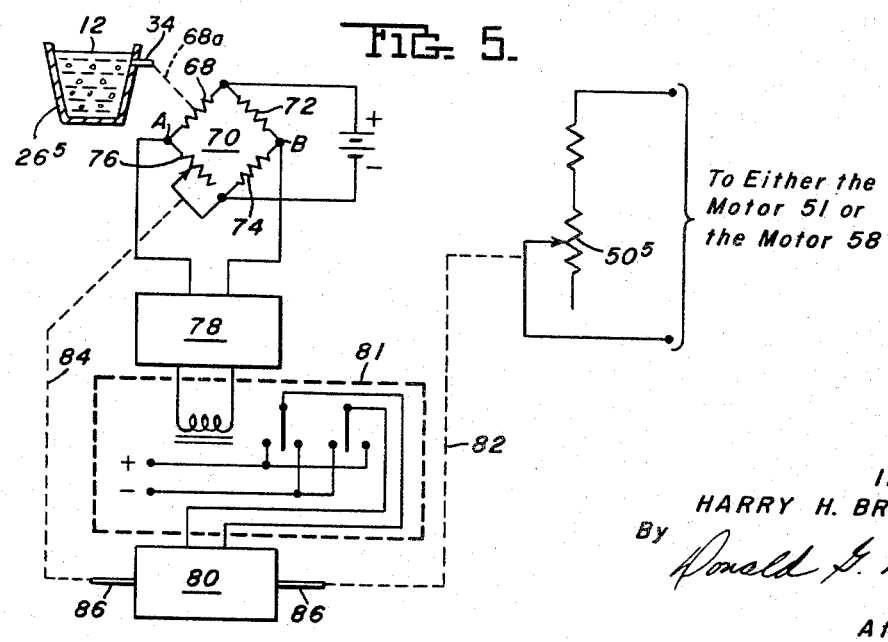

3,415,421
MATERIAL POT WITH CONTROLLED
DUMPING MECHANISM
Harry H. Britcher, Jr., Johnstown, Pa., assignor to United
States Steel Corporation, a corporation of Delaware
Filed Feb. 2, 1967, Ser. No. 613,596
3 Claims. (Cl. 222—166)

ABSTRACT OF THE DISCLOSURE

The present invention relates to material handling apparatus and, more particularly, to an improved dumping mechanism for such material handling apparatus, which improved dumping mechanism provides a uniform pouring rate of a fluid material from the improved dumping mechanism. The improved dumping mechanism comprises a dumping member oscillatable on a frame, a material pot mounted on the dumping member, connectable to and movable with the dumping member and adapted to receive the fluid material. The material pot is provided with material-discharge means. Drive means are connected to the dumping member for rotating the material pot and the fluid material through a path of material-dumping movement to empty the fluid material from the material pot, and control means are associated with the dumping member, connected to the drive means and are operable to cause the drive means to vary the velocity of rotation of the dumping member and the material pot to provide a substantially uniform rate of material discharge from the material-discharge means.

BACKGROUND OF THE INVENTION

For the purpose of producing a slag of the desired basicity and fluidity in a conventional basic oxygen furnace, slag forming fluxes, such as burned lime, fluorspar and mill scale are added in controlled amounts from an overhead storage system (soon after the oxygen jet is applied to the burden in the vessel) through an inclined chute in the side of a water cooled smoke hood that covers the basic oxygen furnace. This slag is the fused product formed by the action of the oxygen on the fluxes, the scrap and the molten iron in the vessel and is usually decanted from the vessel by tilting the vessel backwardly to allow the slag to run off into a slag pot on a conventional slag transfer car, which slag transfer car moves the slag to a slag pit where a crane tips the slag pot to dump the slag into the slag pit. After the slag solidifies and cools in the slag pit, the slag is excavated, crushed and screened by the well-known air cooled slag method.

In producing granulated or marble-sized slag, which is prepared by either pit, jet or dry granulation methods, the slag must be dumped first into a granulation trough at a uniform rate of slag flow thereinto and with a low slag flow trajectory. In addition, the slag pot must be securely retained on the slag transfer car during the dumping operation.

OBJECTS OF THE INVENTION

It is the general object of the present invention to avoid and overcome the foregoing and other difficulties of and objections to prior art practices by the provision of an improved dumping mechanism for a material-handling apparatus, which improved dumping mechanism:

(a) Accurately controls the material flow during the material-dumping operation;

(b) Retains the material pot on the material-handling apparatus during the material-dumping operation;

(c) Provides uniform volume of material flow into a material-processing apparatus during the material-dumping operation by compensating automatically for temperature variations in the material and variations in the residual volume in the material pot; and (d) Provides a low trajectory of material flow into a material processing apparatus.

BRIEF SUMMARY OF THE INVENTION

The aforesaid objects of the present invention, and other objects which will become apparent as the description proceeds, are achieved by providing in a material-handling apparatus for dumping a fluid material and having a frame, an improved dumping mechanism. This improved dumping mechanism has a dumping member oscillatable on the frame, and a material pot mounted on the dumping member, connectable to and movable with the dumping member and adapted to receive the fluid material. The material pot is provided with material discharge means. Drive means are connected to the dumping member for rotating the material pot and the fluid material through a path of material-dumping movement to empty the fluid material from the material pot, and control means are associated with the dumping member, connected to the drive means and operable to cause the drive means to vary the velocity of rotation of the dumping member and the material pot to provide a substantially uniform rate of material discharge from the material-discharge means.

Alternatively, the improved dumping mechanism has a dumping member oscillatable on the frame, and a material pot mounted on the dumping member, connectable to and movable with the dumping member and adapted to receive the fluid material. The material pot is provided with material-discharge means. Drive means are connected to the dumping member for rotating the material pot and the fluid material through a path of material-dumping movement to empty the fluid material from the material pot. Metering means are movable in the material-discharge means to vary the cross-sectional area of the material-discharge means. A second drive means is connected to the metering means for reciprocating the metering means in the material-discharge means, and control means are associated with the metering means, connected to the second drive means and operable to cause the second drive means to move the metering means in the material-discharge means to vary the cross-sectional area of the material-discharge means and to provide a substantially uniform rate of material discharge from the material-discharge means.

BRIEF DESCRIPTION OF THE SEVERAL VIEWS OF THE DRAWINGS

For a better understanding of the present invention reference should be had to the accompanying drawings, wherein like numerals of reference indicate similar parts throughout the several views and wherein:

FIGURE 3 is a fragmentary side elevational view partially in schematic form showing the control means and associated portions of the drive means;

FIGURE 4 is a side elevational view of the slag pot showing a metering means on the slag outlet and connected to the control means; and FIGURE 5 is a diagrammatic view including a schematic diagram of an alternative embodiment of the control means.

Although the principles of the present invention are broadly applicable to dumping mechanisms, the present invention is particularly adapted for use in conjunction with a dumping mechanism for a slag transfer car and hence it has been so illustrated and will be so described.

DETAILED DESCRIPTION

Figure 2:
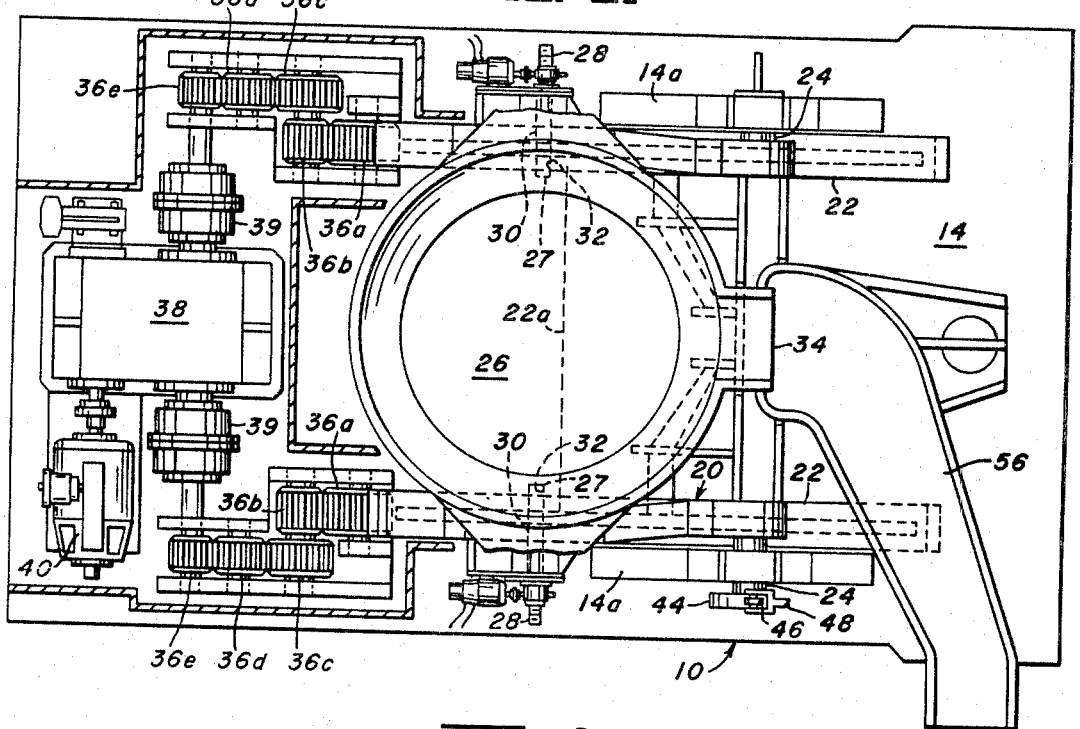
FIGURE 2 is a plan view of the slag-transfer car shown in FIGURE 1 with the cam arrangement omitted for clarity.
Figure 1:
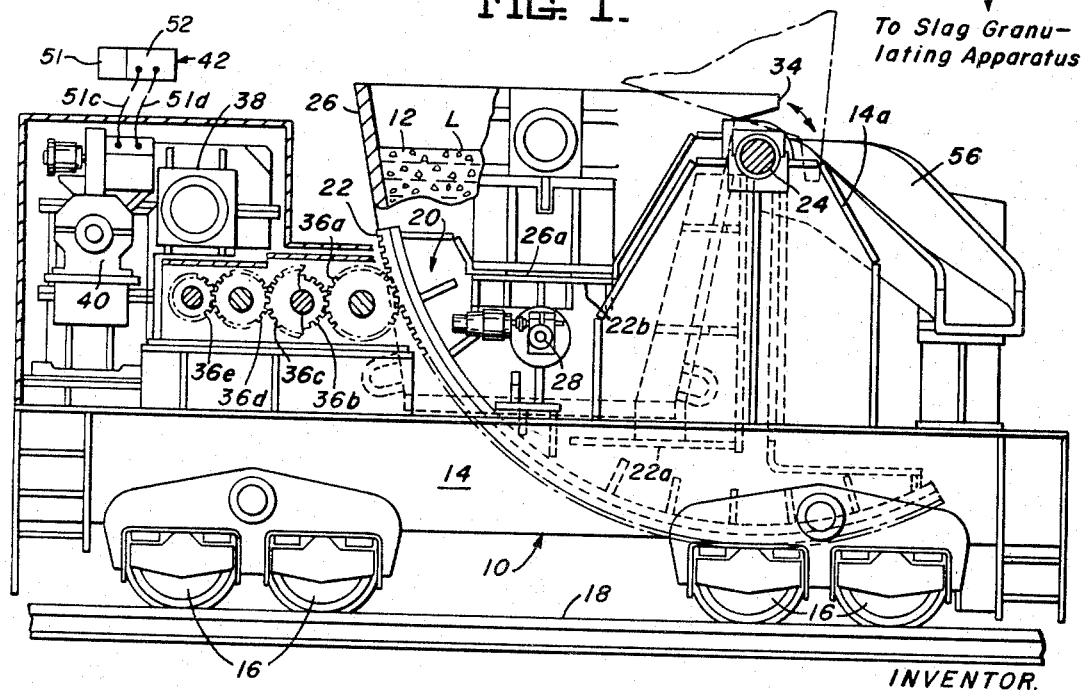
FIGURE 1 is a side elevational view of a slag-transfer car incorporating the improved dumping mechanism of this invention and with the heat shields and splash guards removed for clarity.

With specific reference to the form of the present invention illustrated in the drawings, and referring particularly to FIGURES 1 and 2, a material-handling apparatus, such as a slag transfer car, is indicated generally by the reference numeral 10.

This slag car 10 is employed for dumping a fluid material, such as slag 12 (FIGURES 1, 4, 5), and has a frame 14 (FIGURES 1, 2) mounted on wheels 16 (FIGURE 1), which wheels 16 ride on the tracks 18. An improved dumping mechanism 20 (FIGURES 1, 2) has a dumping member, such as tilting gears 22 oscillatable on stub shafts 24, the shafts 24 being mounted in brackets 14a upstanding from the frame 14. The tilting gears 22 are integrated by a platform 22a to form the dumping mechanism 20.

A material pot, such as a slag pot 26 (FIGURES 1, 2), has ears 26a (FIGURE 1) seated on and wedged against pads 22b of the dumping mechanism 20. Such slag pot 26 is connected, in this case removably connected, by means of prongs 27 (FIGURES 2, 4) on the extremities of motor-operated screw jacks 28, which prongs 27 are movable through openings 30 (FIGURE 2) in the tilting gears 22 to engage notches 32 (FIGURES 2, 4) in the slag pot 26 so that the slag pot 26 and the tilting gears 22 move integrally. This slag pot 26, of course, receives hot slag 12 from a furnace, such as a basic oxygen furnace (not shown), while the slag pot 26 is in the slag-receiving position shown in FIGURE 1.

As shown in FIGURES 1 and 2, the slag pot 26 is provided with material-discharge means, such as a slag outlet 34, provided with a discharge opening of uniform cross-sectional size.

For the purpose of rotating the tilting gear 22, drive means is provided, such as gear trains (FIGURES 1, 2), each including gears 36a, 36b, 36c, 36d, 36e, a gear reducer 38 for driving the gear trains by means of couplers 39 (FIGURE 1), a motor 40 and a motor generator set 42 (FIGURES 1, 3). The gears 36a are connected to the tilting gears 22 for rotating the slag pot 26 and the slag 12 through a path of material dumping movement from the slag-receiving position shown in FIGURE 1 through an arc of about 90° in clockwise direction, as shown in FIGURE 1, to a slag-dumping position (shown in broken lines in FIGURE 1) thereby emptying the slag 12 from the slag pot 26.

CONTROL MEANS

In order to provide a substantially uniform rate of material discharge, in this case for the slag 12, from the material-discharge means or slag outlet 34 of the slag pot 26, control means are associated with the tilting gear 22. The control means, such as a cam 44 (FIGURES 2, 3), is mounted on the shaft 24 to rotate with the tilting gear 22 and slag pot 26. Such cam 44 engages a cam follower 46 carried by a movable arm 48 of a variable resistance 50 (FIGURE 3), which variable resistance 50 is connected to a motor 51 of the motor generator set 42 by lines 51a and 51b (FIGURE 3). Lines 51c and 51d (FIGURES 1, 3) connect a generator 52 to the motor 40.

The cam 44 is operable to vary the resistance of the variable resistor 50 (during movement of the tilting gear 22, slag pot 26 and cam 44 from the slag-receiving position (FIGURE 1) to the slag dumping position) with resultant increase in the output of the generator 52 and attendant increased speed of the motor 40 and increased tilting rotative speed of the tilting gears 22 and slag pot 26.

As the level L (FIGURES 1, 4) of the volume of slag 12 drops in the slag pot 26 during the dumping cycle, the tilting speed of the tilting gear 22 increases thereby maintaining uniform flow of slag 12 through the slag outlet 34 and a short drop fall of slag 12 into a trough 56 (FIGURES 1, 2) extending to slag-granulating apparatus (not shown).

ALTERNATIVE EMBODIMENTS

It will be understood by those skilled in the art that alternatively, the variable resistance 50 of the control means (FIGURE 3) associated with the cam 44 is connected by the lines 51a, 51b to a motor 58 (FIGURE 4), which motor 58 drives a jackscrew 60 mounted in a yoke 62, the yoke 62 being mounted on the slag pot $26^4$ and bridging the slag outlet $34^4$. This jackscrew 60 carries metering means, such as the slide 64 movable or reciprocable by the jackscrew 60 in suitable guides 66 in the yoke 62. The control means energizes the motor 58 to vary the cross-sectional area of the slag outlet $34^4$ (i.e., increases the cross-sectional area of the slag outlet 34 as the slag level L drops in the slag pot 26), while the motor 40 of the drive means associated with the tilting gear 22 and the tilting gear 22 run at substantially constant speed, thereby again providing substantially uniform rate of slag discharge from the slag outlet $34^4$ into the trough $56^4$. The slide 64 may also be reciprocable in the side wall of the slag trough $34^4$ to vary the cross-sectional area thereof.

Referring to FIGURE 5, a temperature-sensing means, such as a resistance thermometer 68, is connected to the slag pot $26^5$ by a line 68a to measure the temperature of the slag pot $26^5$ and the slag 12 therein. Such resistance thermometer 68 functions as a variable resistance in a bridge circuit 70, having the fixed resistances 72, 74 and the variable resistance 76. A change in the temperature of the slag pot $26^5$ causes a resistance change in the resistance thermometer 68 thereby unbalancing the bridge circuit 70 and producing a voltage signal across AB, which voltage signal is amplified by an amplifier 78 and used to energize a servomotor 80 by means of a servocontrol relay 81. Arms 82, 84 on the output shaft 86 of the servomotor 80 vary the resistance of the variable resistance $50^5$ (with, for example, resultant increase in the output of the generator 52 and attendant increased speed of the motor 40 and increased tilting rotative speed of the tilting gears 22 and the slag pot 26) and the variable resistance 76 (until balance is again obtained in the bridge circuit 70 and the servomotor 80 stops). As shown in FIGURE 5, the variable resistor $50^5$ may be connected to the motor 51, as in FIGURE 3, or to the motor 58 as in FIGURE 4.

Alternatively the temperature-sensing means may be a thermocouple (not shown) or a thermal radiator detector, such as a lead sulfide photoconductive sensor (not shown) for the infrared of the type manufactured by Eastman Kodak Company, Rochester, N.Y. as the Ektron Detector.

SUMMARY OF THE ACHIEVEMENTS OF THE OBJECTS OF THE INVENTION

It will be recognized by those skilled in the art that the objects of the present invention have been achieved by providing an improved material-handling apparatus for dumping material which accurately controls the material flow during the material-dumping operation; retains the material pot on the material-handling apparatus during the material-dumping operation; provides uniform volume of material flow into a material-processing apparatus during the material-dumping operation by compensating automatically for temperature variations in the material and variations in the residual volume in the material pot; and provides a low trajectory of material flow into a material-processing apparatus.

While in accordance with the patent statutes preferred and alternative embodiments of the present invention have been illustrated and described in detail, it is to be particularly understood that the invention is not limited thereto or thereby.

I claim:

1. In a material-handling apparatus for dumping a fluid material and having a frame, an improved dumping mechanism comprising:
   (a) a dumping member oscillatable on said frame,
   (b) a material pot mounted on said dumping member, connectable to and movable with said dumping member and adapted to receive said fluid material,
      (1) said material pot being provided with material-discharge means,
   (c) drive means connected to said dumping member for rotating said material pot and said fluid material through a path of material-dumping movement to empty said fluid material from said material pot, and
   (d) control means oscillatable with said dumping member, connected to said drive means and operable to cause said drive means to vary the velocity of rotation of said dumping member and said material pot during dumping to provide a substantially uniform rate of material discharge from said material-discharge means,
      (1) said control means having a cam oscillatable with said dumping member, variable voltage supply means in engagement with said cam and operable thereby to supply a variable voltage, a motor generator means having its motor connected to the output of said variable voltage supply means and its generator connected to said drive means.

2. In a material-handling apparatus for dumping a fluid material and having a frame, an improved dumping mechanism comprising:
   (a) a dumping member oscillatable on said frame,
   (b) a material pot mounted on said dumping member connectable to and movable with said dumping member and adapted to receive said fluid material,
      (1) said material pot being provided with material-discharge means,
   (c) drive means connected to said dumping member for rotating said material pot and said fluid material through a path of material dumping movement to empty said fluid material from said material pot,
   (d) metering means movable in said material-discharge means to vary the cross-sectional area of said material-discharge means,
   (e) a second drive means connected to said metering means for moving said metering means with respect to said material-discharge means, and
   (f) control means associated with said metering means connected to said second drive means and operable to cause said second drive means to move said metering means with respect to said material-discharge means to vary the cross-sectional area of said material-discharge means and to provide a substantially uniform rate of material-discharge from said said material-discharge means.

3. The apparatus recited in claim 2 wherein said control means has a cam oscillatable with said dumping member, and variable voltage supply means in engagement with said cam and operable thereby to supply a variable voltage, said second drive means being connected to the output of said variable voltage supply means.

References Cited

UNITED STATES PATENTS

| | | | |
|---|---|---|---|
| 780,372 | 1/1905 | McCoy | 222—166 |
| 1,273,391 | 7/1918 | McClure et al. | 105—273 |
| 2,040,157 | 5/1936 | Story et al. | 222—166 X |
| 2,042,037 | 5/1936 | Camerota | 222—166 |
| 2,088,546 | 7/1937 | Camerota | 222—166 |
| 2,597,811 | 5/1952 | Nolan | 222—166 X |
| 2,772,455 | 12/1956 | Easton et al. | 222—166 |
| 2,917,207 | 12/1959 | Prowse et al. | 222—55 |
| 3,056,179 | 10/1962 | Lorang | 222—63 |

FOREIGN PATENTS 2,942   1914   Great Britain.

ROBERT B REEVES, *Primary Examiner.*

KENNETH N. LEIMER, *Assistant Examiner.*

U.S. Cl. X.R.

105—271; 214—18; 222—54, 63, 504